US012637907B2

(12) United States Patent
Tolanov-Vogl et al.

(10) Patent No.: US 12,637,907 B2
(45) Date of Patent: May 26, 2026

(54) BLOCKING ELEMENT, ACCESS CONTROL DEVICE AND SYSTEM

(71) Applicant: SkiData GmbH, Salzburg (AT)

(72) Inventors: Danijela Tolanov-Vogl, Salzburg (AT); Werner Weber, Salzburg (AT); Marco Rihl, Salzburg (AT); Jürgen Schieren, Salzburg (AT)

(73) Assignee: SKIDATA GMBH, Salzburg (AT)

( * ) Notice: Subject to any disclaimer, the term of this patent is extended or adjusted under 35 U.S.C. 154(b) by 0 days.

(21) Appl. No.: 18/841,285

(22) PCT Filed: Mar. 1, 2023

(86) PCT No.: PCT/EP2023/055229
§ 371 (c)(1),
(2) Date: Aug. 23, 2024

(87) PCT Pub. No.: WO2023/166086
PCT Pub. Date: Sep. 7, 2023

(65) Prior Publication Data
US 2025/0188799 A1 Jun. 12, 2025

(30) Foreign Application Priority Data
Mar. 2, 2022 (EP) .................................... 22159787

(51) Int. Cl.
*E06B 11/08* (2006.01)
*G07C 9/20* (2020.01)

(52) U.S. Cl.
CPC .............. *E06B 11/085* (2013.01); *G07C 9/20* (2020.01)

(58) Field of Classification Search
CPC .......... E01F 13/04; G07C 9/20; E06B 11/085; E06B 11/025; E06B 11/02
See application file for complete search history.

(56) References Cited

U.S. PATENT DOCUMENTS 2,731,744 A * 1/1956 Schnell .................. E06B 11/02 49/59
2,874,493 A * 2/1959 Mandel .................. B61L 29/04 49/93

(Continued)

*Primary Examiner* — Muhammad Ijaz
*Assistant Examiner* — Susan M. Heschel
(74) *Attorney, Agent, or Firm* — POLSINELLI LLP

(57) ABSTRACT

The present disclosure relates to the field of access control. In particular, the present disclosure relates to reversibly blocking and releasing passage through a passageway for people, the vehicle or the like. Further in particular, the present disclosure relates to a blocking element, access control device access control system. Accordingly, there is provided a blocking element (110) for selectively blocking a passageway (712), comprising at least four substantially inflexible sections (112), and at least three substantially flexible sections (114), wherein each substantially flexible section is arranged between and/or connecting two substantially inflexible sections, wherein the substantially flexible sections are arranged such that two particular substantially inflexible sections arranged adjacent to a particular flexible section, are adapted to be rotatable relative to one another, wherein the two outermost substantially inflexible sections are arranged as end sections (116) including a first end section and a second end section, and wherein the end sections are adapted for attaching the blocking element to an actuation mechanism (610).

18 Claims, 8 Drawing Sheets

(56) References Cited

U.S. PATENT DOCUMENTS

| | | | | | |
|---|---|---|---|---|---|
| 3,753,317 | A * | 8/1973 | Turpin | E06B 11/085 | 49/34 |
| 6,370,821 | B1 * | 4/2002 | McCord | B61L 29/04 | 49/34 |
| 9,822,501 | B2 * | 11/2017 | Younce | E01F 13/10 | |
| 11,255,125 | B2 * | 2/2022 | Rihl | G07C 9/10 | |
| 11,840,876 | B2 * | 12/2023 | Raynal | E05F 17/00 | |

* cited by examiner

BLOCKING ELEMENT, ACCESS CONTROL DEVICE AND SYSTEM

CROSS-REFERENCES TO RELATED APPLICATIONS

This application is a U.S. National Stage of PCT Application No. PCT/EP2023/055229, filed Mar. 1, 2023, which claims the priority benefit of European Patent Application No. 22159787.5 filed on Mar. 2, 2022, both of which are incorporated herein by reference in their entirety for all purposes.

TECHNICAL FIELD

The present disclosure relates to the field of access control. In particular, the present disclosure relates to reversibly blocking and releasing passage through a passageway for people, the vehicle, or the like. Further in particular, the present disclosure relates to a blocking element, access control device and an access control system.

BACKGROUND

The present disclosure relates to the field of access control. Access control devices are used to selectively provide or block access for people, vehicles or animals and the like, all of which are referred to as passers in the context of this disclosure, In order to provide or block access, a blocking element may be used to open or close a passageway through which e.g., a person is supposed to pass in order to access what is beyond the passageway. For example, in a ski resort, a person travelling up the mountain with a ski lift needs to pass through a turnstile type access control device, which opens for the person and allows access to the boarding area of the ski lift. The passageway is released after the access control device has confirmed the authorization to do so, e.g., by verifying that the person trying to pass through the passageway owns a valid access pass. Other application scenarios comprise providing or blocking access to a sports arena, concert venue or music hall. Still further, it is conceivable that the access control device is blocking or releasing access to vehicles, e.g., to enter or exit a parking lot after proper validation of the authorization to do so.

Common access control devices often comprise barrier element that operate in a rotation configuration, e.g., a two-arm or three-arm configuration that rotated while the person passes through the passage way. This not only provides the access functionality but at the same time also serves a separation between passers, so to assure that only a single passer at a time is able to pass through the passageway. Such two-arm or three-arm configurations are often used in access control devices in sport arenas or ski resorts. Since the angle between two adjacent arms is usually 120° (for the three-arm configuration) or 180° (for the two arm-configuration), the entire passageway cannot be released completely, as at least one arm regularly protrudes into the passageway at a given point in time of the rotation of the arms. Such two-arm or three-arm configurations may thus not allow the free passing of large objects through the passageway like people hauling luggage, using a shopping cart or a wheelchair, or generally vehicles.

Access control devices using rotating arms regularly use arm is made of substantially stiff material like e.g., metal or hard plastic material. As such, the movement of the arms may pose a safety or health risk to a person passing through the passageway, with improper use of possibly leading to injury of or damage to the passer. Further, a simple arm may not block a passageway sufficiently secure to prevent unauthorised passing.

Currently, there is no blocking element on the market for access control devices that may cover both narrow accesses (for single persons, e.g., for skiers) and wide accesses (for wheelchair users, mountain bikers, persons with strollers, etc.) at the same time while being convenient for end users and operators. Existing access control devices, such as turnstiles, always form a barrier and cannot be used by certain groups of people (e.g. wheelchair users or people with strollers). Swinging doors that open the passageway completely take up too much space.

Thus, there may be a need for improved access control that provides a flexible release of the passageway to allow the passage of passers.

Further, there may be a need for access control which provides a safe and secure access through the passageway, both with regard to the health of the passer and the safety of the access, i.e., to assure only passers with a valid authorization are able to pass the passageway.

SUMMARY

At least one such need may be met by the subject-matter of the independent claims. Preferred embodiments are provided in the dependent claims and are explained in detail in the following description.

The present invention provides a blocking element, access control device access control system.

According to a first aspect of the disclosure, there is provided a blocking element for selectively blocking a passageway, comprising a at least four substantially inflexible sections, and at least three substantially flexible sections, wherein each substantially flexible section is arranged between and/or connecting two substantially inflexible sections, wherein the substantially flexible sections are arranged such that two particular substantially inflexible sections arranged adjacent to a particular flexible section, are adapted to be rotatable relative to one another, wherein the two outermost substantially inflexible sections are arranged as end sections including a first end section and a second end section, and wherein the end sections are adapted for attaching the blocking element to an actuation mechanism.

According to a second aspect of the disclosure, there is provided an access control device comprising at least one blocking element according to the present disclosure, comprising an actuation mechanism operatively connected with the blocking element, wherein the actuation mechanism is arranged to actuate the blocking element, wherein the blocking element, when actuated by the actuation mechanism is adapted to transition between a blocking state and a non-blocking state, wherein in the blocking state, the blocking element is arranged at least partly introduced in a passageway, and wherein in the non-blocking state, the blocking element is arranged at least partly removed from the passageway.

According to a third aspect of the disclosure, there is provided a control system, comprising at least two access control devices according to the present disclosure, wherein the two access control devices are arranged opposing each other so to form a passageway between the two access control devices, wherein the blocking elements of the two access control devices are adapted to at least partially block the passageway, when at least one of the blocking elements of the two access control devices is arranged in the blocking state, and in particular wherein in the non-blocking state the passage through the passageway is open so that a person, and animal, a vehicle, a passer or an object is able to pass through the passageway substantially unimpeded.

According to a further aspect of the disclosure, there is provided an access control device comprising at least one blocking element according to the present disclosure, comprising an actuation mechanism operatively connected with the blocking element, wherein the actuation mechanism is arranged to actuate the blocking element, wherein the blocking element, when actuated by the actuation mechanism is adapted to transition between a blocking state and a non-blocking state.

The blocking element according to the present disclosure may be a substantially reversibly mechanically deformable element. Without any external force, the blocking element may assume a defined first shape. With an external force acting on the blocking element, the blocking element may assume a second shape different from the first shape. In particular, the shapes different from the first shape may progressively vary with the magnitude and/or duration of external force acting on the blocking element. The blocking element may in particular be an element that is built with and/or comprises a retaining force, so that when being deformed into the second shape, tries to reassume the defined first shape.

The blocking element, in the first shape, may comprise a substantially linear shape, so to exhibit a geometrically small footprint, while the second shape, the geometrical footprint may become successively larger. E.g., the blocking element may comprise a straight section in the first shape that is progressively bent when assuming the second shape. It is to be understood that the second shape need not be a single defined shape, but may be a plurality of shapes, in particular progressively varying shapes resulting from the external for respecting on the blocking element.

The blocking element according to the present disclosure, in particular when being arranged attached to a suitable actuator mechanism, may thus assume the first shape with a geometrical the small footprint, in particular without any external force acting on the blocking element, so that a passageway adjacent to the blocking element and/or the access control device is substantially free to be passed by a passer. Further, when the blocking element is in second shape, in particular when an external force is acting on the blocking element, may assume a geometrically larger footprint, so that the passageway adjacent to the blocking element and/or the access control device is at least partially blocked for a passer.

The blocking element according to the present disclosure provides wider and more comfortable access through a passageway, so that the passage is to be blocked using a new concept instead of using a turnstile. For this purpose, an elastic and flexible part may be used, which is deformed by an actuation mechanism (e.g., two 90° opposing levers). Due to its special shape, it may bend only at certain points, thus creating a barrier when bent. The design shall achieve sufficiently high rigidity in the closed state, but still be soft enough not to injure or damage a passer. The blocking element shall be set up safely and easily and take up as little space as possible. This flexible blocking solution is designed as a flat element, and may comprise sheet inserts, e.g., made of metal, for rigidity, and may be connected at the ends to the levers. Alternatively, the levers may be integrated into, or be integral part, of the flexible blocking element By turning the levers, the blocking element may arche into the passageway area and block it, i.e., by assuming the second shape due to the deformation by the actuation mechanism.

Alternatively, the lever and the blocking element may be combined in one part, thereby constituting a one-piece blocking element. The blocking elements comprise at least four substantially inflexible sections and at least three substantially flexible sections. The four substantially inflexible sections are connected e.g., via thinned sections constituting the substantially flexible sections, which act as a hinge. This prevents the fingers from being pinched and the "scissor movement" in this area is completely defused. The one-piece blocking element exhibits a simple design due to reduced number of components and may therefore be produced more cost effective. The flexible blocking element may exhibit less friction and require less lubrication, provide good miniaturization capabilities, ease of fabrication due to simple or no assembly, and low maintenance. The blocking element itself may thus be manufactured much simpler, as no inserted parts such as sleeves for bolts of hinges are required. Furthermore, with the one-piece blocking element no insert plates, i.e., internal bracing or stiffening, may be required to keep the blocking element in an assumed shape, e.g., to avoid accidental or intentional bending from its main position. Further, it may be visually more appealing to customers. Still further, the one-piece blocking element may provide a reduced risk of injury between the end sections and the housing of an access control device and between the end sections and the remainder of the blocking element, e.g., due to the living hinge design.

An access control device according to the present disclosure may provide an elastic barrier, which almost disappear in open, i.e., unblocked state. The mechanics may prevent injuries or locking of people due to fast moving parts. The opening of the passageway, the disappearing of the mechanical and/or optical barrier should preferably require 2 seconds or less.

Further, the access control device of the present disclosure provides for an open gate concept. I.e., in case a passer without a valid permission tries to pass through the passageway, the gate may close, while the pre-set position of the blocking element is open. The access control device of the present disclosure may prevent injury of a passer due to the closing of the blocking element.

Still further, the access control device of the present disclosure provides for an open gate function in evacuation scenarios or panic situations, by substantially completely opening and keep open the passageway so to allow a passing of a plurality of passers unhindered.

In other words, the blocking element is a flexible band or spring, which is substantially flat in a state when no external forces are acting on it, e.g., by an actuating mechanism, and curved or bent or otherwise deformed from the flat shape at least in a tapered area of the blocking element in a state when an actuation mechanism, e.g., a motor and/or gear unit provides an external force acting on it. By said external force, the band/spring is bent and thereby curved in the substantially flexible sections by the applied energy. In "closed" state, i.e., the blocking state, the blocking element is curved. In "open" state, the blocking element is only slightly curved, possibly flat or almost flat, and parallel to the housing of an access control device. The blocking element may thus be bendable so to be curved/uncurved when transitioning between the closed and open state. Preferably, the blocking element has a high torsional stiffness, e.g., due to its breadth, thickness and/or due to stiffening sections, bracings, struts and/or inlay element within the interior of the material of the blocking element. The stiffness may be sufficiently high in order to avoid passers passing in closed state, e.g., by bending the blocking element. In particular, the stillness may be such that a bending in order to pass the passageway by a human being or other passer is substantially prohibited, as it would require above average or supranatural force.

Opening and closing may be performed very quickly. In comparison to a foldaway or a turnstile, the space required for opening and closing may be comparatively small. Where a turnstile occupies the area before, after and at the level of the passageway, or a flap gate occupies the area before or after and at the level of the passageway, the blocking element according to the present disclosure only needs the area of the passageway itself to retract/extend the barrier, comparable to a sliding door concept.

Generally, a flexible section or substantially flexible section allows the relative movement of two adjacent inflexible sections substantially inflexible sections. E.g., a flexible section may be bent so that the two adjacent inflexible sections substantially rotate relative to one another. An example of a flexible section is a hinge mechanism, e.g., a living hinge, a rotatable joint.

A substantially inflexible section shall be understood as an element or section of an element that resists deformation in the course of normal operation of a blocking element, at least to large, substantial extent. In particular, an inflexible section may be substantially stiffer or more inflexible compared to the adjacent flexible section flexible sections. Additionally, or alternatively, inflexible sections may generally comprise internal elements, e.g., bars, struts or bracings that provide the inflexibility to the inflexible sections. E.g., a flexible section and inflexible section may differ by their respective material content or composition, material shape and/or the provision of additional stiffening elements, either internal or external.

It is generally conceivable that the blocking element may be arranged vertically or horizontally or even an oblique angle relative to the passageway, as long as the extension direction of the blocking element when transitioning between the non-blocking state and the blocking state is into the passageway and thus perpendicular to the passing direction through the passageway. It is further generally conceivable that a plurality of blocking elements are provided, in a vertical and/or horizontal succession, thereby increasing the blocking height, blocking length and/or the blocking area.

A counter rotation of one element vs. another element may be understood as having opposite rotation directions. E.g., when one element rotates in a counter clockwise direction, the other element rotates in a clockwise direction.

According to an embodiment of the present, the blocking element may be formed as a one-piece element.

A one-piece element may be produced more economically and more efficiently. A one-piece element may not require the subsequent connecting of a plurality of elements thereby increasing the reliability and longevity. In particular by providing the blocking element made of substantially the same material in all sections may result in a reduced risk of injury to a passer.

According to a further embodiment of the present, at least some of the substantially inflexible sections and the substantially flexible sections may be made of at least one material out of the group consisting of plastic, polymer, textile, polyurethane, metal, aluminium, steel, composite material, fiber composite material and carbon fiber composite material.

According to a further embodiment of the present, wherein the substantially inflexible sections may comprise a substantially non-flat, triangular, strutted, t-shaped, trapezoidal, diamond, rhombic, cycloidal, elliptic, and/or oval shape, and/or wherein the substantially flexible sections may comprise a substantially flat shape, and/or wherein the substantially flexible sections may comprise a reduced solidity of its material compared to the substantially inflexible sections that renders the substantially flexible sections more flexible than the substantially inflexible sections.

The flexible sections may in particular be more flexible than the inflexible sections when operating the blocking element in normal conditions so that when external forces are acting on the blocking element the flexible sections may deform prior to a deformation occurring at the inflexible elements. In particular, the flexible sections may be more flexible than the inflexible sections by a choice of material or material composition and/or by a dedicated difference in shape or structural composition. E.g., some or all inflexible sections may be of a metal or composite material and/or having a shape that renders the inflexible, in particular more inflexible than the flexible sections, while the flexible sections are made of a material and/or shape allowing a flexible deformation when operating the blocking element normal conditions.

According to a further embodiment of the present, at least the two end sections may be arranged as a lever element.

A lever may be understood as a simple machine or element consisting of a beam or rigid rod pivoted at a fixed hinge, or fulcrum. A lever may be a rigid element capable of rotating on a point on itself. A lever may amplify an input force to provide a greater output force. The ratio of the output force to the input force is the mechanical advantage of the lever. A lever may thus be used to transmit or inject the rotation of an actuating element to a part of the blocking element.

According to a further embodiment of the present, the substantially flexible sections may be arranged as hinge elements and/or rotatable joints.

A hinge may be understood as a mechanical bearing that connects two solid objects, typically allowing only a limited angle of rotation between them. Two objects connected by an ideal hinge rotate relative to each other about a fixed axis of rotation with all other translations or rotations being prevented, and thus a hinge may be seen as having one degree of freedom. Hinges may be made of flexible material or of moving components. Bearings enable movements in desired degrees of freedom and prevent movements in the undesired degrees of freedom. A hinge may also be referred to as a rotatable joint.

The force required for a hinge element or a rotatable joint, or a substantially flexible section generally to deform may be comparably small. E.g., the force required for deformation may be neglectable, since the substantially inflexible sections do not deform but only transmit force to the flexible sections, the required force of an actuation mechanism may be comparably small as well. E.g., the provided force may substantially correspond to the force required for moving the blocking element, i.e., transitioning between the non-blocking state and the blocking state, with only a minor part being required to inflict deformation.

According to a further embodiment of the present, the actuation mechanism may comprise a first rotatable element, and a second rotatable element, wherein the rotational axes of the first rotatable element and the second rotatable element may be substantially parallel, wherein each of the rotatable elements may be operatively connected with one end section of the blocking element, wherein the actuation mechanism may be arranged, when actuating the blocking element, to rotate the first rotatable element and the second rotatable element in opposite directions, and wherein by rotating the first rotatable element and the second rotatable element, the blocking element may be adapted to transition between the blocking state and the non-blocking state.

According to a further embodiment of the present, the blocking element, in the non-blocking state, may be arranged substantially flat and/or the substantially inflexible sections may be arranged so that their respective longitudinal extensions are substantially parallel, and wherein the blocking element, in the blocking state, may be arranged non-flat and/or wherein the substantially inflexible sections may be arranged so that at least some of their respective longitudinal extensions are non-parallel and/or wherein the blocking element assumes a shape out the group consisting of square, rectangle, rhombus, kite, parallelogram, trapezoid and triangle.

According to a further embodiment of the present, wherein in the non-blocking state adjacent substantially inflexible sections may be arranged so to form angle between their longitudinal extensions of one of 0° to 5°, 0° to 10°, 0° to 15°, 0° to 20°, 0° to 30°, 175° to 185°, 170° to 190°, 160° to 200°, 355° to 360°, 350° to 360°, 345° to 360°, 340° to 360°, and 330° to 360°, and wherein in the blocking state adjacent substantially inflexible sections may be arranged so to form angle between their longitudinal extensions of one of 85° to 95°, 80° to 90°, 90° to 100°, 80° to 100°, 70° to 90°, 75° to 105°, 70° to 110°, 65° to 115°, and 60° to 120°.

By rotating, particular counter rotating the end sections of the blocking element, the blocking element may transition between the non-blocking state and blocking state, i.e., between a state where the blocking element is substantially linear and flat, to a state where it assumes a larger geometrical cross section, so to provide a barrier functionality in a passageway.

According to a further embodiment of the present, the actuation mechanism may comprise a single actuator element arranged to actuate both the first rotatable element and the second rotatable element, in particular comprising a gearing module to provide the counter rotation of the first rotatable element relative to the second rotatable element, or wherein the actuation mechanism may comprise two actuator elements arranged to independently actuate the first rotatable element and the second rotatable element.

According to a further embodiment of the present, an actuator element may be one of an electric actuator element, an electromagnetic actuator element, a hydraulic actuator element and a pneumatic actuator element.

A single actuator element, in particular together with an appropriate mechanical transmission mechanism so that rotation/counter rotation is provided to both attachment points of blocking element, may provide an inherent synchronisation of the rotation of the two end sections of the blocking element. Alternatively, in case two actuator elements are employed, each individual actuator element may be dimensioned smaller compared to an embodiment using a single actuator element since each actuator element may be required to actuate only one end section of the blocking element, thereby possibly reducing required size and cost. In case of two actuator elements, a separate synchronisation of the actuator elements may be provided, e.g., a mechanical and/or electronic synchronisation.

According to a further embodiment of the present, the access control device may further comprise a housing for accommodating at least one element of the blocking element, the actuation mechanism, an actuator element and a rotatable element, and a substantially static barrier element, wherein the housing and the static barrier element define the passageway.

The housing may comprise a recess so that the blocking element, when in the non-blocking state, is substantially or completely arranged within the recess blocking state, so that the passageway is substantially or completely open, and no part of the retracted blocking element is substantially interfering with the passage of the passageway by a passer.

According to a further embodiment of the present, wherein the access control device may comprise a plurality of blocking elements arranged vertically to one other.

By providing a plurality of vertically stacked blocking elements, the total blocking height of the access control device may be increased so that also passages with a comparably large height may be secured by a comparably small blocking element, a plurality thereof. The plurality of blocking elements may be arranged vertically or above one another in a gravity acting direction.

According to a further embodiment of the present, wherein the access control device may comprise a sensor element for determining when passage of a passer through the passageway is concluded, and the access control device is arranged for closing the passageway.

Such a sensor element may e.g., be a camera element, a presence detection element or an acquisition element acquiring whether an access token allowing the passage through the passageway is in the vicinity of the access control device. E.g., when a passer is approaching the access control device, and in particular a valid access authorisation is detected, the sensor element may control the operation of the access control device such that the passageway is adequately released or opened, e.g., partially or fully, depending on passing requirement of the current passer. After the passage of the passer, the sensor element may detect the conclusion of the passage through the passageway and may thus close the passageway, i.e., transition the blocking element from the partially or fully un-blocked state to the blocked state.

BRIEF DESCRIPTION OF THE DRAWINGS

The present invention will now be described with reference to the accompanying drawings, in which.

DETAILED DESCRIPTION

Figure 1:
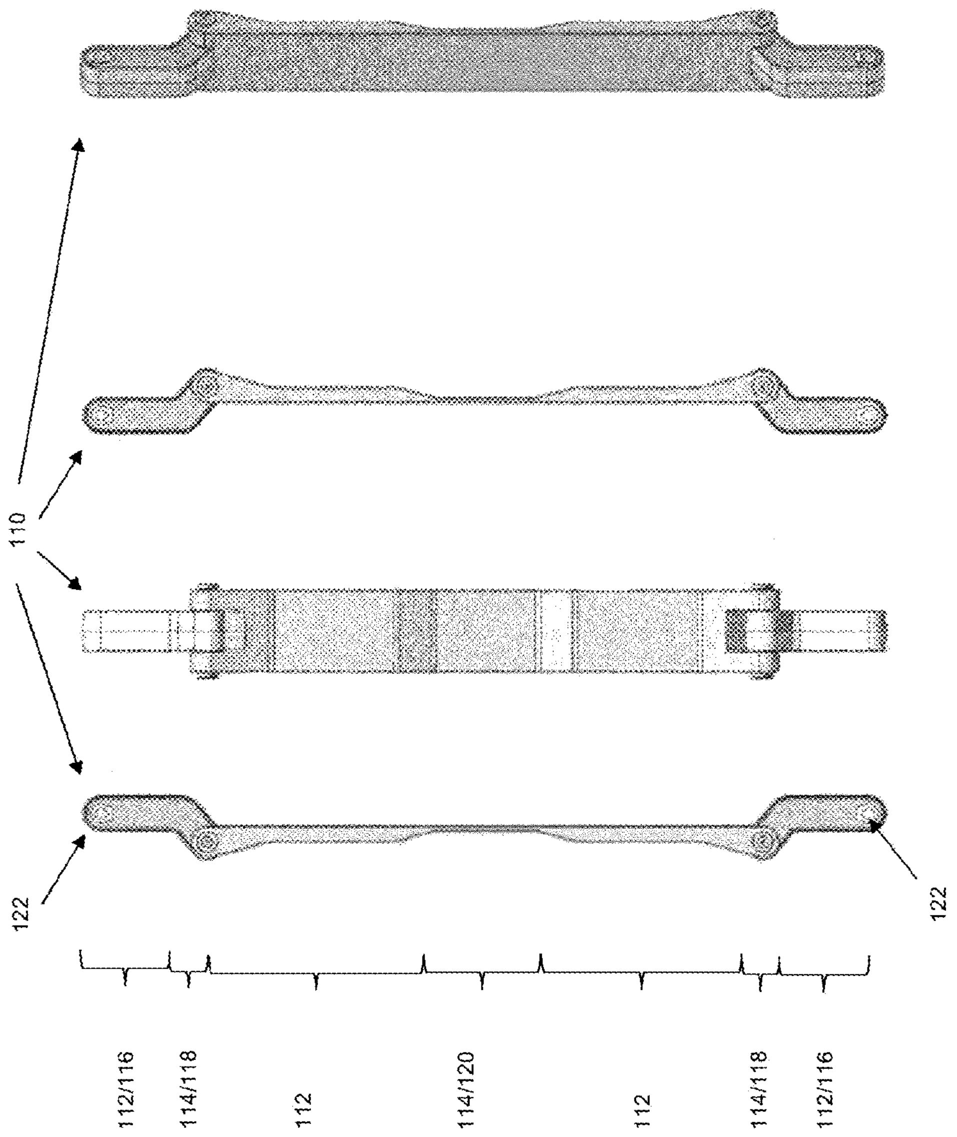
FIG. 1 shows a first embodiment of a blocking element according to the present disclosure.

Now referring to FIG. 1, showing a first embodiment of a blocking element according to the present disclosure.

The blocking element 110 comprises a plurality of individual sections that are movable relative to one another. It comprises exemplarily four substantially inflexible sections 112 and three substantially flexible sections 114, in an alternating arrangement. In other words, each substantially flexible section 114 is connected to two substantially inflexible sections 112, while each substantially inflexible section 112 is connected to either one or two substantially flexible sections 114. In FIG. 1, the central element comprising two inflexible sections 112 and one flexible section 114 is embodied as a one-piece element e.g., made of the same material and possibly manufactured in a single combined manufacturing step. As can be seen in FIG. 1, the flexible section 114 is built smaller, more delicate and/or with less material than the inflexible sections 112, so that when the blocking element 110 is deformed, the substantially inflexible sections 112 remain substantially undeformed while the substantially flexible section 114 is deformable, e.g., bendable. The flexible section 114 in FIG. 1 is embodied as a living hinge 120

Adjacent to the three inner sections 112, 114/120, 112 are two further flexible sections 114, embodied exemplarily as rotatable joints 118. Adjacent to each of the rotatable joints 118 is a further inflexible section 112. The outermost inflexible sections 112 constitute the end sections 116 of the blocking element 110. Each inflexible section 112 as an end section 116 comprises an attachment point 122 for attachment of an actuation mechanism. The inflexible elements 112 of the end sections 116 may be embodied as lever elements, e.g., made from a metal or another suitably rigid or inflexible material. The elements of the central one-piece element 112, 114, 112 may be made of e.g., a rubber or plastic material, e.g., polyurethane.

Figure 2:
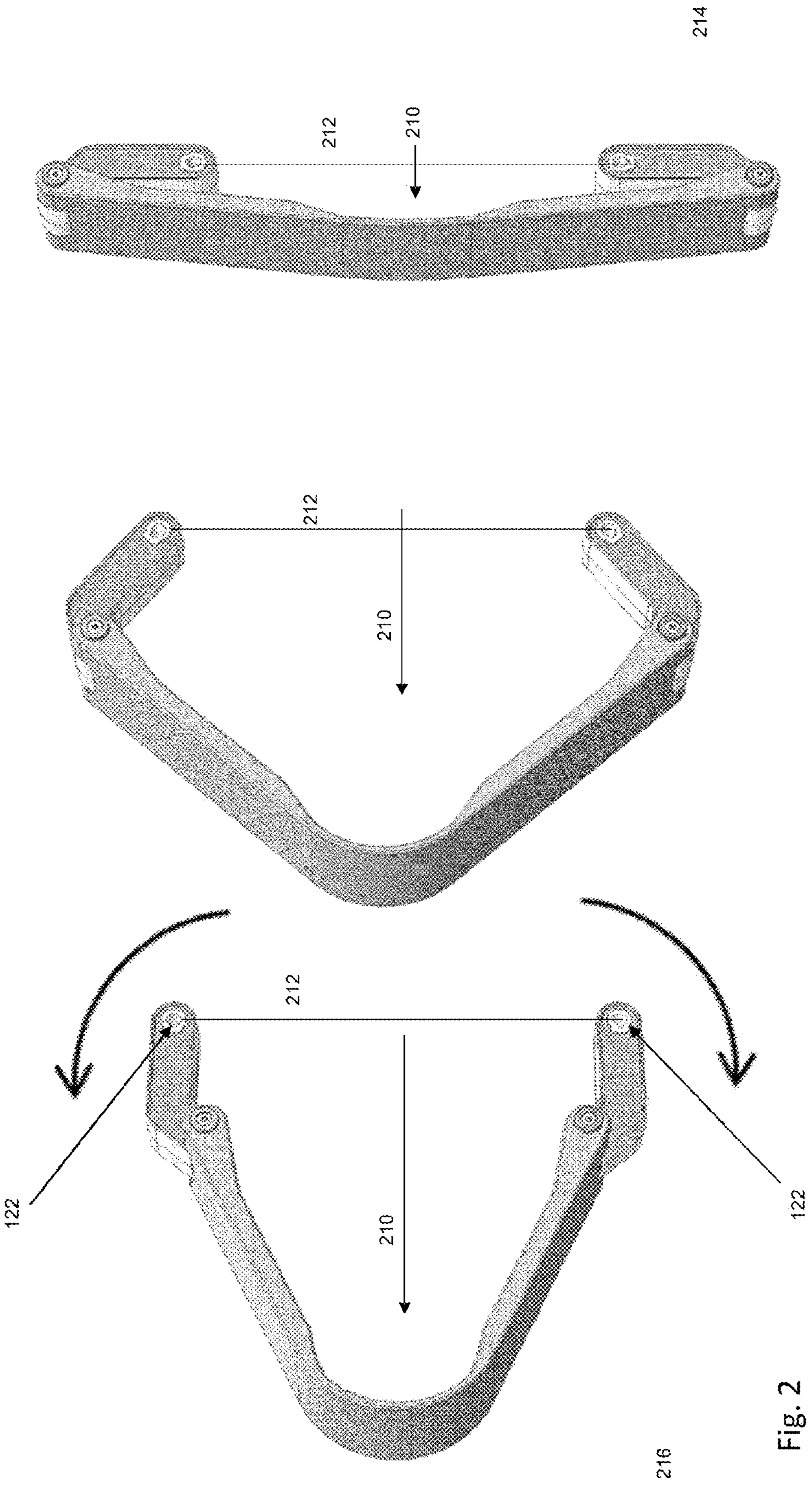
FIG. 2 shows a transitional movement between a non-blocking state and a blocking state of the first embodiment of the blocking element according to the present disclosure.

Now referring to FIG. 2, showing a transitional movement between a non-blocking state and a blocking state of the first embodiment of the blocking element according to the present disclosure.

FIG. 2 shows three individual positions of the blocking element 110, where the rightmost position is the position in a non-blocking state 214 while the left most position is the position in a blocking state 216. The centre position is an intermediate position between the non-blocking state 214 and the blocking state 216. With the attachment points 122 attached to an actuation mechanism, the distance 212 between the attachment points remains substantially equal during the movement of the blocking element 110. The actuation mechanism provides a rotatory movement to the attachment points 122. The rotation of the top attachment point and of the bottom attachment point are counter-rotating, so that, exemplarily, the top end section 116 is rotated counter clockwise to assume the blocking state 214, while the bottom end section 116 is rotates clockwise to assume the blocking state 214.

Since the distance 212 between the attachment points remains equal during the rotation of the end sections 116, it follows that the distance between the two substantially flexible sections 114, embodied as a rotatable joint 118, is shortened when transitioning into the blocking state 216, and lengthened when transitioning into the non-blocking state 214. Consequently, since the distance between the rotatable joints 118 is reduced in the blocking state 216 compared to the non-blocking state 214, this results in a deformation of the central one-piece element comprising the central flexible section 114 and the adjacent inflexible sections 112. Since inflexible sections 112 resist a deformation, this results in the deformation of the central flexible section 114, which is exemplarily bent, so that the two adjacent inflexible sections 112 rotate relative to one another.

The orientation of the blocking element 110 may be such that the extension direction 210 of the blocking element is perpendicular to the general travelling or passing direction through the passageway. Generally, a blocking element may be oriented horizontally or vertically or at an oblique angle, as long as the extension direction is such that the width of the passageway may be influenced by the transitioning between the non-blocking state 214 and the blocking state 216. The rotatable joints 118 may comprise bearings and be substantially freely rotatable with little resistance, while the force of the actuation mechanism is mainly used for bending of the central flexible section 214.

Figure 3:
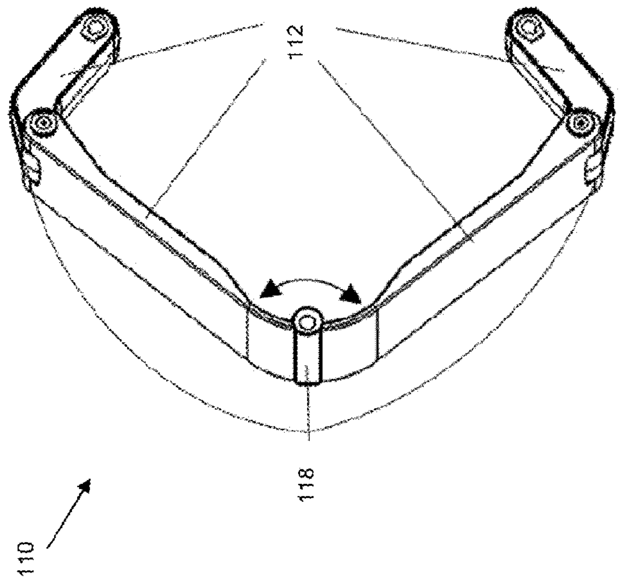
FIG. 3 shows an alternative embodiment of the first embodiment of the blocking element according to the present disclosure.

Now referring to FIG. 3, showing an alternative embodiment of the first embodiment of the blocking element according to the present disclosure.

The blocking element 110 of FIG. 3 differs in that the central one-piece element comprises a rotatable joint 118 instead of the living hinge 120. It follows that the central element may not be a one-piece element anymore, but depending on a specific embodiment of the central flexible section 114 be at least a two-piece or three piece element. The blocking element may comprise a spring element, that forces the two central inflexible sections 112 into a parallel orientation, or the rotational movement of the end sections 116 may suffice to straighten the central element when transitioning into the non-blocking state.

Figure 4:
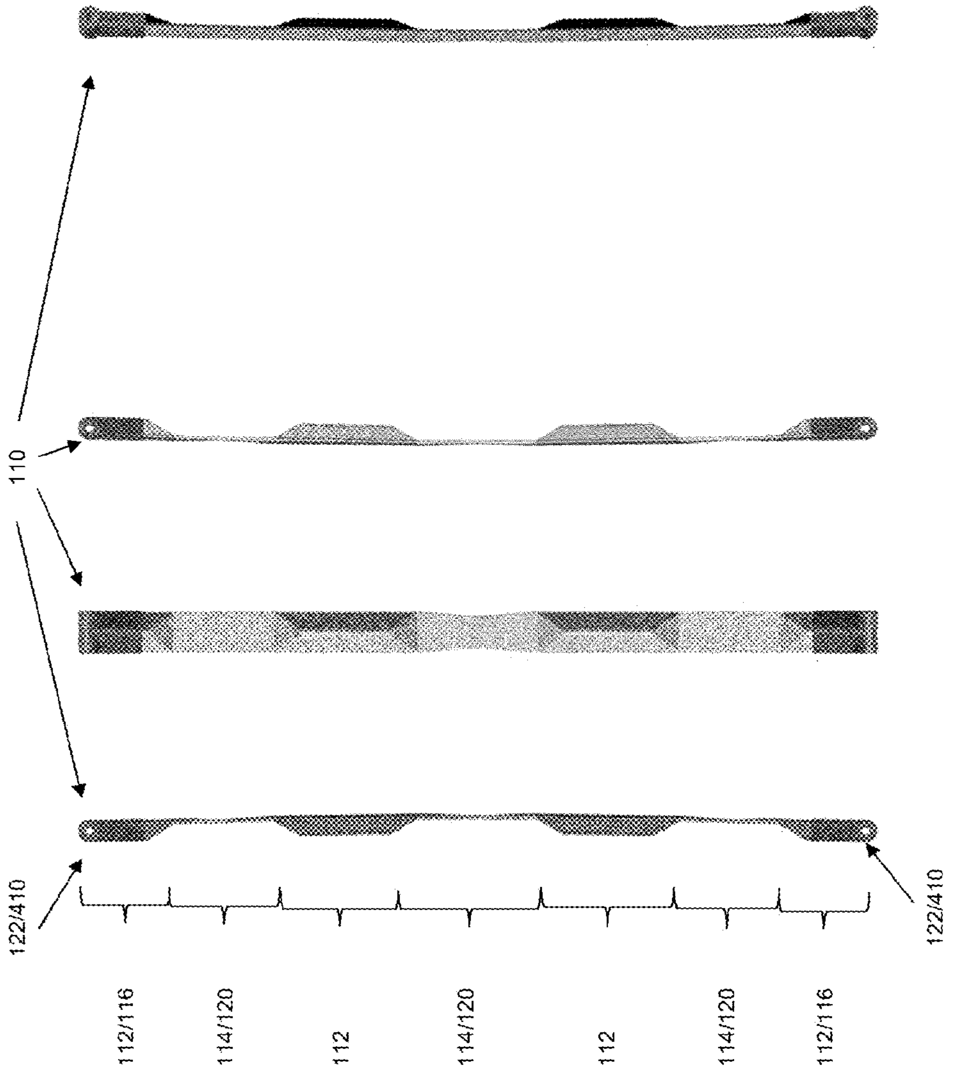
FIG. 4 shows a second embodiment of a blocking element according to the present disclosure.

Now referring to FIG. 4, showing a second embodiment of a blocking element according to the present disclosure.

The second embodiment of the blocking element 110 differs from the first embodiment in that all four inflexible sections 112 and all three flexible sections 114 form a one-piece element. In other words, not only the central flexible section 114 is embodied as a living hinge 120 but all three flexible sections are embodied as a living hinge 120. In FIG. 4, the end sections 116 exemplarily comprise a separate clamping element 410, attached to the two outermost inflexible sections 114/116, and comprising the attachment points 112 to the actuation mechanism. The clamping element 410 may add to the stiffness or inflexibility of the end sections or may merely provide an attachment for the attachment point. It is equally conceivable that the end sections 116 comprise integrally formed attachment points for the actuation mechanism.

The inflexible sections 112 are exemplary embodied having a triangle or pyramid cross section, which provides the inflexibility or stiffness of the inflexible sections 112. Other cross sections are conceivable as long as they contribute to the inflexibility or stiffness of the inflexible sections 112. It is further conceivable that the inflexible sections 112 comprise struts of bracing element in the interior to add to the inflexibility or stiffness.

Figure 5:
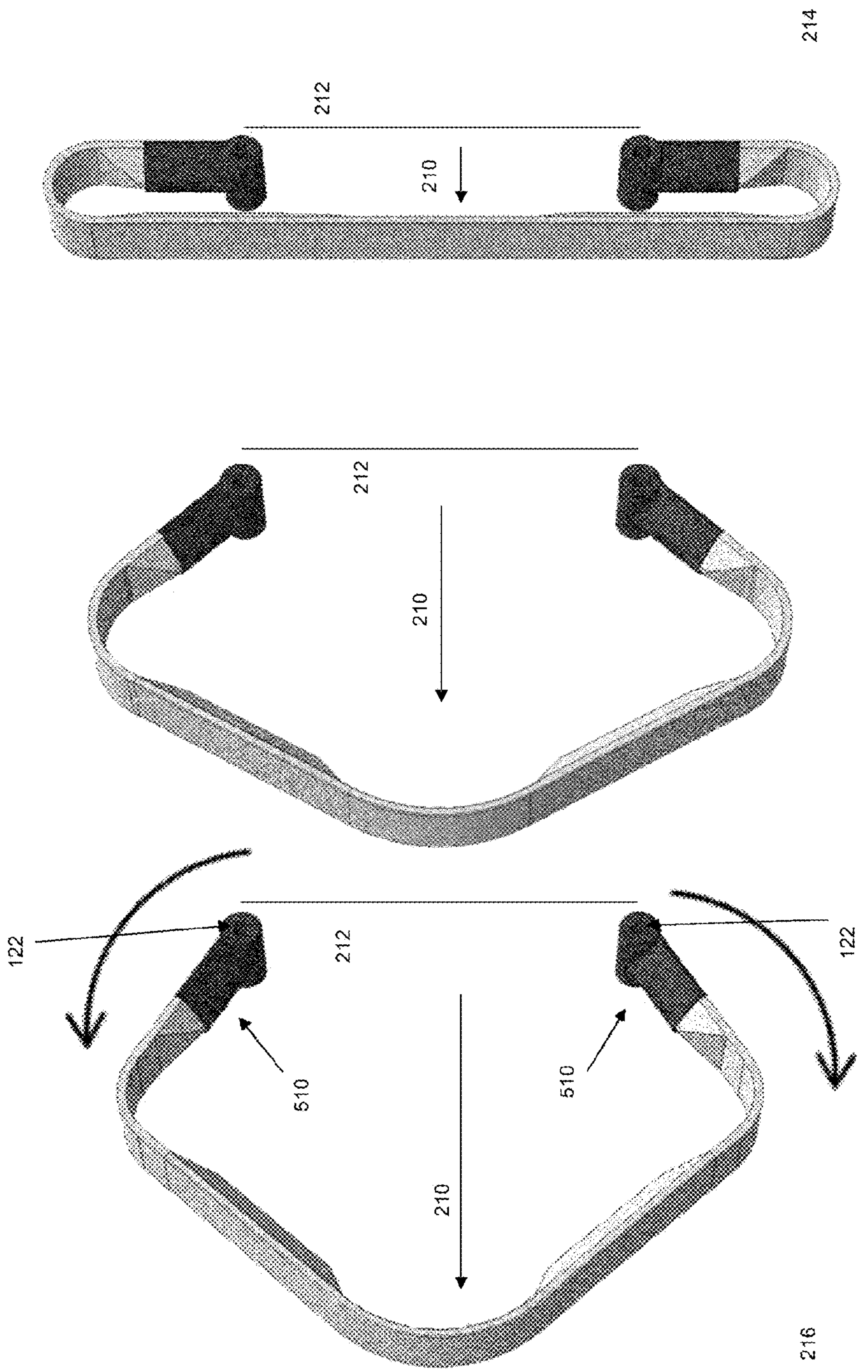
FIG. 5 shows a transitional movement between a non-blocking state and a blocking state of the second embodiment of the blocking element according to the present disclosure.

Now referring to FIG. 5, showing a transitional movement between a non-blocking state and a blocking state of the second embodiment of the blocking element according to the present disclosure.

The transition between a non-blocking state and a blocking state shown in FIG. 5 may largely be comparable to the transition shown in FIG. 2. Since the blocking element 110 of the second embodiment comprises three living hinges 120, the force provided by the actuation mechanism may be distributed, in particular substantially evenly distributed, across all three flexible sections 114. Since the top and bottom flexible sections 114 may be seen as more flexible than the rotatable joints 118 of the first embodiment, the blocking element 110 of the second embodiment may be generally slightly more flexible than the blocking element 110 of the first embodiment. This may result in a reduced potential for injury, since the blocking element may be more deformable due to impact from external forces than the blocking element 110 of the first embodiment. E.g., a passer that is wedged between one or two blocking elements may deform the blocking element 110 of the second embodiment to a larger extent so that potentially the risk of injury is reduced.

Figure 6B:
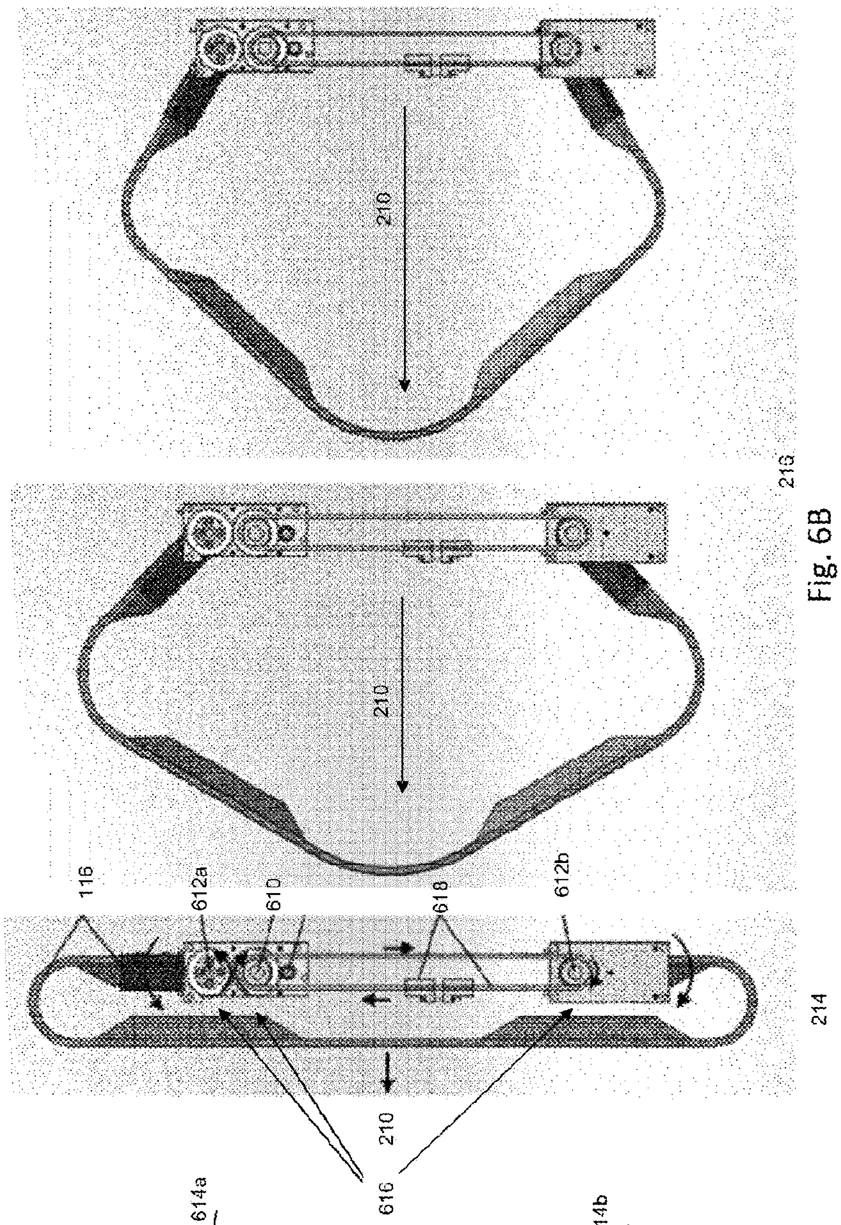
FIGS. 6A,B show the actuation mechanism according to the present disclosure.
Figure 6A:
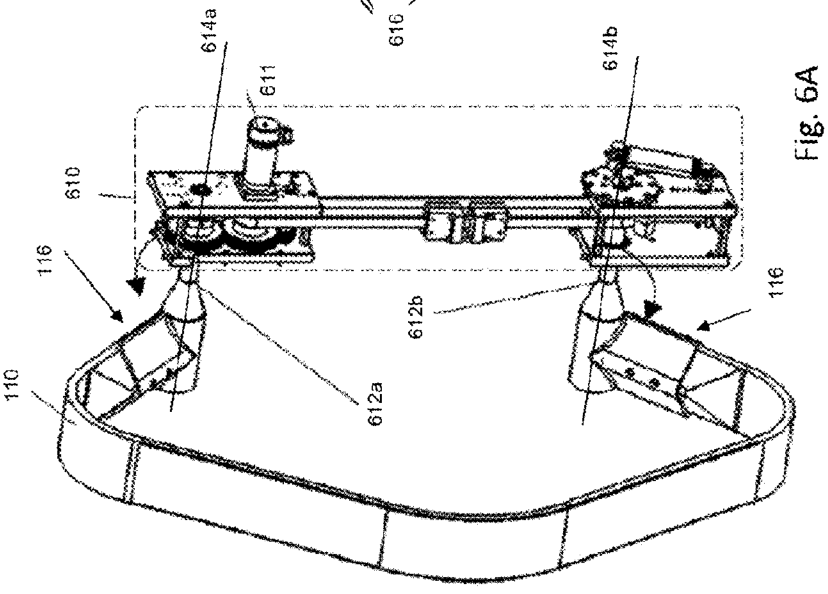

Now referring to FIGS. 6A,B, showing the actuation mechanism according to the present disclosure.

The exemplary embodiment of the actuation mechanism 610 comprises a single actuator element 611, e.g., an electric motor, that acts on and rotates two rotatable elements 612*a,b*. The two rotatable elements 612*a,b* are engaged with the attachment points 112 of the blocking element 110, thereby transmitting the rotation onto the end sections 116, and thus the two outermost inflexible elements 112. Exemplarily, the rotation of the actuator element 611 is transmitted to the rotatable element 612*a* substantially directly, at least via an arrangement of one or two gearwheels, e.g., toothed gearwheels, which may also include a suitable transmission ratio so to adapt the rotation of the actuator element 611 to the desired rotation of the rotatable element 612*a*. The belt 618 provides a synchronization function so that it is assured that the rotation of the rotatable elements 612*a,b* results in a uniform extension or retraction of the blocking element 110 into or from the passageway.

Further, the rotation of the actuator element 611 may be transmitted to the rotatable element 612*b* substantially indirectly, at least via a belt 618 actuated by the rotation of the actuator element 611. The rotation provided to the rotatable element 612*a* may in particular be counter or opposite to the rotation provided to the rotatable element 612*b*, thereby resulting in a counter rotation of the end sections 116 when transitioning between the non-blocking state 214 and the blocking state 216. The belt may transmit the rotation to the rotatable element 612*b* at least via an arrangement of one or two gearwheels, e.g., a toothed gearwheel, which may also include a suitable transmission ratio so to adapt the rotation of the actuator element 611 to the desired rotation of the rotatable element 612*b*. The rotational axis 614*a,b* of the rotatable elements 612*a,b* may in particular be parallel.

Alternatively, each rotational element 612*a,b* may be actuated by a separate, individual actuator element, e.g., independent electric motors, so that a belt 618 may be not required. In this case other means for synchronizing the rotation of the rotatable elements 612*a,b* may be provided, e.g., an electronic synchronization. FIG. 6A,B show the blocking element 110 according to the second embodiment, however it is conceivable that the blocking element 110 according to the first embodiment may equally be used.

Figure 7B:
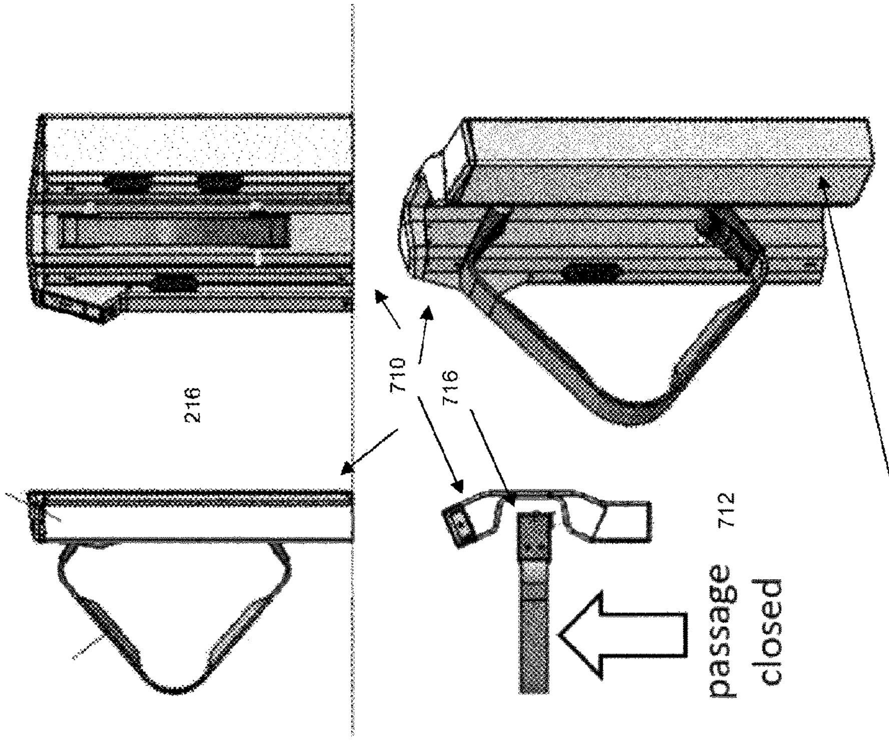
FIG. 7A,B show an exemplary embodiment of access control device according to the present disclosure.
Figure 7A:
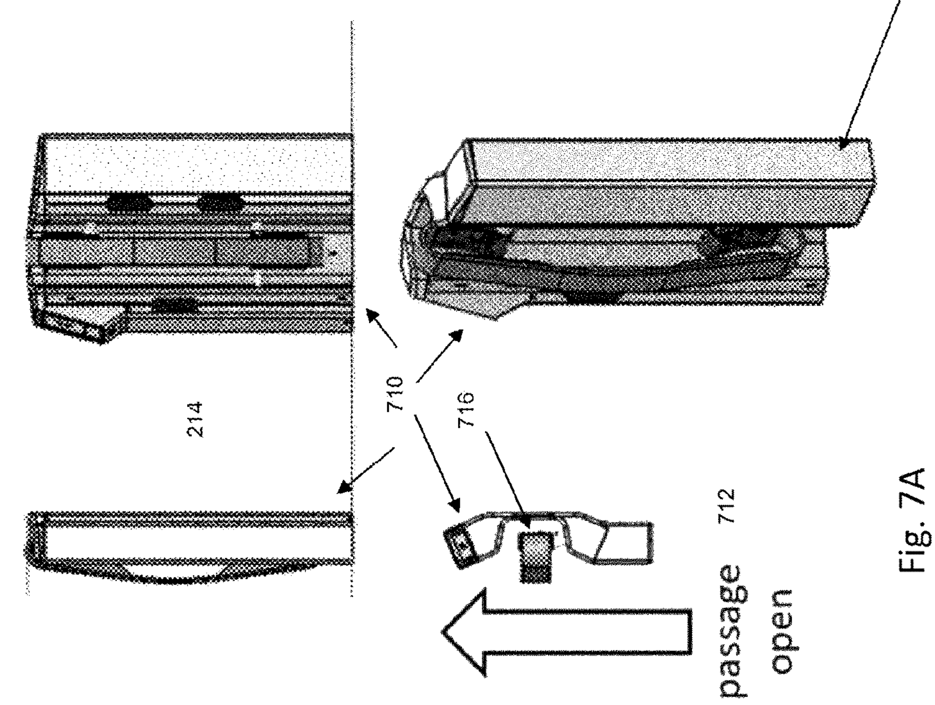

Now referring to FIG. 7A,B, showing an exemplary embodiment of access control device according to the present disclosure.

In FIG. 7A, the passageway 712 is open and the blocking element 110 in the non-blocking state 214, while in FIG. 7B, the passageway 712 is closed or blocked and the blocking element 110 is in the blocking state 216. The access control device 710 comprises a housing 714 that may accommodate the actuation mechanism 610, such that only the rotatable elements 612*a,b* protrude and are externally visible. The housing comprises a recess 716 so that the blocking element 110 in the non-blocking state 214 is substantially or completely arranged in the recess, thereby providing a substantially unobstructed passage of the passageway to passers.

In FIG. 7B, the blocking element 110 is in the blocking state 216, so that it extends into the passageway 712. The blocking element 110 extends perpendicular to the passing direction through the passageway 712, thereby reducing the free width of the passageway, blocking the passageway to passers. With the open frame arrangement of the blocking element, injury to passers may be avoided, even in case on a passing attempt while the blocking element is in the blocked state or transitioning to or from the blocked state. E.g., a pinching or squeezing in the blocking element may substantially be avoided or prohibited.

It is also generally conceivable that the blocking element may not be arranged vertically as in FIGS. 7A,B, but horizontally or even an oblique angle, as long as the extension direction 210 of the blocking element in into the passageway 710. It is further generally conceivable that a plurality of blocking elements is provided, in a vertical and/or horizontal succession, thereby increasing the blocking height, blocking length and/or the blocking area.

Figure 8:
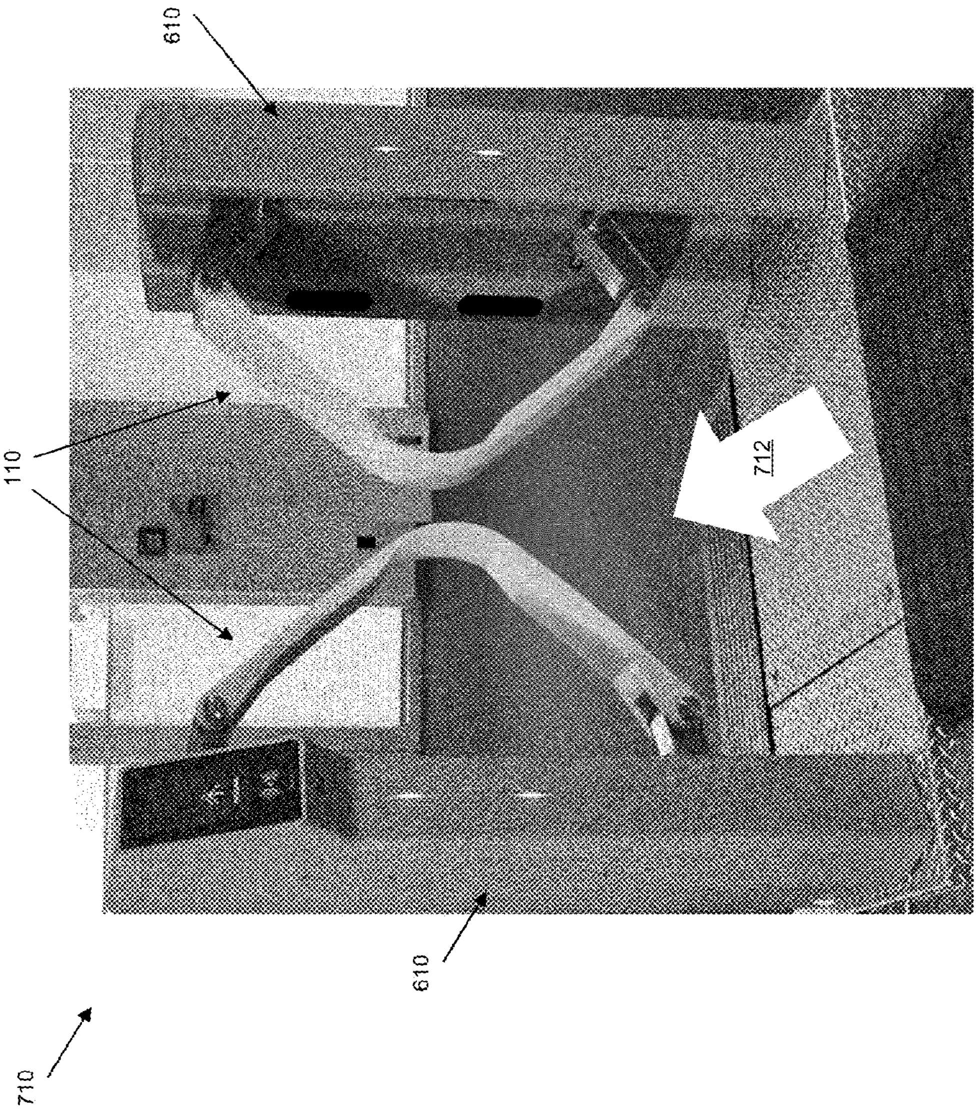
FIG. 8 shows an exemplary embodiment of access control system according to the present disclosure.

Now referring to FIG. 8, showing an exemplary embodiment of access control system according to the present disclosure.

The access control system 810 of FIG. 8 essentially comprises two access control devices 710, in a mirrored configuration, with one access control device 710 on each side of the passageway 710. Thereby, the width of the passageway may be increased, without increasing the dimensions of the individual access control devices 710. It is conceivable that both or only one select access control device 710 opens the passageway 710, thereby adapting the passable area. E.g., in case a pedestrian in passing through the passageway, only one of the access control devices 710 may unblock the passageway. Alternatively, both access control devices 710 may unblock the passageway to a lesser degree than the full opening, thereby increasing operation speed. When now a passer with an increased space requirement is passing through the passageway, both access control devices 710 may open, thereby providing an increased size of the passageway. The operation of the opening of one or both (full or partly) access control devices 710 may be controlled by an access token used by the passer that is associated with the required passing width and/or by senor means, e.g., by a camera surveying the passageway and adapted for determining the passage requirements.

It is to be understood that the invention is not limited to the embodiments described above, and various modifications and improvements may be made without deviating from the concepts described here. Any of the features described above and below may be used separately or in combination with any other features described herein, provided they are not mutually exclusive, and the disclosure extends to and includes all combinations and sub-combinations of one or more features described herein.

Finally, it should be noted that the term "comprising" not exclude other elements or steps, and that "a" or "one" does not exclude the plural. Elements that are described in relation to different types of embodiments can be combined. Reference signs in the claims shall not be construed as limiting the scope of a claim.

LIST OF REFERENCE NUMERALS

110 blocking element
112 substantially inflexible sections
114 substantially flexible sections
116 end sections
118 rotatable joint

120 living hinge
122 attachment point for actuation mechanism
210 extension direction perpendicular to the passageway
212 distance between attachment points
214 non-blocking state
216 blocking state
410 clamping element
510 bracket
610 actuation mechanism
611 actuator element
612*a,b* rotatable elements
614*a,b* rotational axis
616 gearing arrangement
618 belt
710 access control device
712 passageway
714 housing
716 recess
810 access control system

The invention claimed is:

1. A blocking element for selectively blocking a passageway, comprising:

at least four substantially inflexible sections; and at least three substantially flexible sections;

wherein the blocking element is formed as a one-piece element, wherein each substantially flexible section is arranged between and/or connecting two substantially inflexible sections, wherein the at least three substantially flexible sections are arranged such that two particular substantially inflexible sections arranged adjacent to a particular flexible section, are adapted to be rotatable relative to one another, wherein two outermost substantially inflexible sections are arranged as end sections including a first end section and a second end section, and wherein the end sections are adapted for attaching the blocking element to an actuation mechanism.

2. The blocking element of claim 1, wherein at least some of the at least four substantially inflexible sections and the at least three substantially flexible sections are made of at least one material including at least one of plastic, polymer, textile, polyurethane, metal, aluminium, steel, composite material, fiber composite material, or carbon fiber composite material.

3. The blocking element of claim 1, wherein at least the first end section and the second end section are arranged as a lever element.

4. The blocking element of claim 1, wherein the at least three substantially flexible sections are arranged as hinge elements and/or rotatable joints.

5. The blocking element of claim 1, wherein at least one of:

the at least four substantially inflexible sections comprise a substantially non-flat or triangular, shape;

the at least three substantially flexible sections comprise a substantially flat shape; or the at least three substantially flexible sections comprise a reduced solidity of its material compared to the at least four substantially inflexible sections that renders the at least three substantially flexible sections more flexible than the at least four substantially inflexible sections.

6. The blocking element of claim 1, wherein the blocking element is part of an access control device, the access control device comprising:

the actuation mechanism operatively connected with the blocking element, wherein the actuation mechanism is arranged to actuate the blocking element, wherein the blocking element, when actuated by the actuation mechanism is adapted to transition between a blocking state and a non-blocking state, wherein in the blocking state, the blocking element is arranged at least partly introduced in a passageway, and wherein in the non-blocking state, the blocking element is arranged at least partly removed from the passageway.

7. The blocking element of claim 6, wherein the actuation mechanism comprises:

a first rotatable element; and a second rotatable element, wherein rotational axes of the first rotatable element and the second rotatable element are substantially parallel, wherein each of the first rotatable element and the second rotatable element is operatively connected with one end section of the blocking element, wherein the actuation mechanism is arranged, when actuating the blocking element, to rotate the first rotatable element and the second rotatable element in opposite directions, and wherein by rotating the first rotatable element and the second rotatable element, the blocking element is adapted to transition between the blocking state and the non-blocking state.

8. The blocking element of claim 7, wherein the actuation mechanism comprises a single actuator element arranged to actuate both the first rotatable element and the second rotatable element, comprising a gearing arrangement to provide a counter rotation of the first rotatable element relative to the second rotatable element.

9. The blocking element of claim 8, wherein the single actuator element is one of an electric actuator element, an electromagnetic actuator element, a hydraulic actuator element and a pneumatic actuator element.

10. The blocking element of claim 7, wherein the actuation mechanism comprises two actuator elements arranged to independently actuate the first rotatable element and the second rotatable element.

11. The blocking element of claim 6, wherein the blocking element, in the non-blocking state, is arranged substantially flat.

12. The blocking element of claim 11, wherein the at least four substantially inflexible sections are arranged so that respective longitudinal extensions of the at least four substantially inflexible sections are substantially parallel.

13. The blocking element of claim 6, wherein in the non-blocking state subsequent substantially inflexible sections are arranged so to form angle between longitudinal extensions of the subsequent substantially inflexible sections of one of 0° to 5°, 0° to 10°, 0° to 15°, 0° to 20°, 0° to 30°, 175° to 185°, 170° to 190°, 160° to 200°, 355° to 360°, 350° to 360°, 345° to 360°, 340° to 360°, and 330° to 360°.

14. The blocking element of claim 6, further comprising:

a housing for accommodating at least one element of the blocking element, the actuation mechanism, an actuator element and a rotatable element; and a substantially static barrier element, wherein the housing and the substantially static barrier element define the passageway.

15. The blocking element of claim 6, wherein the blocking element, in the blocking state, is arranged non-flat.

16. The blocking element of claim 15, wherein the at least four substantially inflexible sections are arranged so that at least some respective longitudinal extensions of the at least four substantially inflexible sections are non-parallel.

17. The blocking element of claim 15, wherein the blocking element, in the blocking state, assumes a shape including a square, a rectangle, a rhombus, a kite, a parallelogram, or a trapezoid.

18. The blocking element of claim 6, wherein in the blocking state subsequent substantially inflexible sections are arranged so to form angle between longitudinal extensions of the subsequent substantially inflexible sections of one of 85° to 95°, 80° to 90°, 90° to 100°, 80° to 100°, 70° to 90°, 75° to 105°, 70° to 110°, 65° to 115°, and 60° to 120°.

* * * * *